United States Patent Office 3,307,588
Patented Mar. 7, 1967

3,307,588
METHOD FOR SEALING PIPE AND METHOD FOR PREPARING COMPOSITION USEFUL THEREIN
Peter J. Hylak, Chicago, Ill., assignor to Institute of Gas Technology, a corporation of Illinois
No Drawing. Filed Oct. 28, 1963, Ser. No. 319,580
9 Claims. (Cl. 138—97)

This invention relates to an improved method for sealing substantially uncleaned, buried pipe, and it particularly relates to a method for sealing substantially uncleaned buried pipe with a concrete-making, cement composition and it also relates to a method for the preparation of the sealing composition.

Buried gas pipe is usually made up of sections which are joined together by bell and spigot joints which are sealed with jute or a like material. After gas pipes or mains have been in use for a number of years, leaks commonly develop as a result, for example, of deterioration of the sealing material, or of increasing the gas pressure in the mains in excess of the design pressure thereof. Since gas leaks can not be tolerated, it is important that a leak be sealed as quickly as possible. Furthermore, it is also highly desirable that a leaking portion of the pipe be repaired or sealed without seriously disrupting consumer service.

One convenient method for sealing the leaking portion of a pipe is to excavate the space around the leak and then to seal the leak with a sealant material. When a leaking joint is enclosed or covered by a sealing material, there are two primary paths through which the gas may leak. One path is through the mass of the material itself and the other path is along the interface between the surface of the pipe and the sealant material. Also, since it is highly desirable to substantially avoid surface preparation of pipe before sealing the leak, if there is rust, scale, dust etc. on the joint, the sealing material should also have the ability to penetrate and seal such deposits; for a similar reason, the sealing material must be compatible with the various contaminants which might be present on the surface of the pipe. Furthermore, the sealing material should have a fast cure time so service can be completely restored in a short period of time and, of course, the sealing material should provide a strong joint.

It is therefore an important object of this invention to provide a method for sealing leaks in pressurized gas pipes, wherein gas leakage is substantially eliminated by enclosing the leaking portion of the pipe with a material which is substantially impermeable to gas and is capable of adhering to the interface between the pipe surface and the sealing material.

It is a further object of this invention to provide a method for substantially sealing leaks in substantially uncleaned, buried gas mains by enclosing or encapsulating the leaking portion of the main with a sealing material which is compatible with various contaminants which might be present on the surface of the pipe.

It is also an object of this invention to provide a method for sealing gas pipes by enclosing the space around the leak with a concrete-making, cement composition which is substantially impermeable to the passage of gas, is capable of adhering to the interface between the sealing composition and the surface of the pipe, and has a shrinkage of less than about 0.1% by volume.

It is another object of this invention to provide a method for sealing substantially uncleaned, pressurized gas pipe by substantially enclosing the space around a leaking portion of the pipe with a concrete-making, Portland cement composition mixed in suitable proportions and containing a minor proportion of a surface active agent, whereby the composition is rendered substantially impermeable to gas, the interface between the concrete and the pipe substantially prevents the flow of gas, and the overall shrinkage of the hardened concrete is less than about 0.1% by weight.

It is an additional object of this invention to provide a method which is highly useful for preparing a sealing composition which is effective in my method for sealing substantially uncleaned, buried pipe.

Further purposes and objects of this invention will appear as the specification proceeds.

My method for sealing substantially uncleaned, pressurized gas pipe generally comprises the step of enclosing the space around the leaking portion of the pipe with a concrete-making, cement composition, containing about .0005–.05 part by weight of a surface active agent per part of cement, the sealing composition being capable of substantially preventing the passage of a gaseous medium therethrough, being capable of penetrating and adhering to the substantially uncleaned surface of the pipe, and having a shrinkage of less than about 0.1% by volume.

In my method, the space around the leaking portion of the pipe, as at a bell and spigot joint, of course, is first excavated. It is necessary to remove only excess bulk dirt deposits, while dust, rust and scale can remain; thus, time and effort is not expended in thoroughly cleaning the part to be sealed, such as commonly required with other sealing methods. A concrete form or mold is placed at the leak; desirably, the form should allow the cement to extend about 4 inches, in each direction, from the leak, as from the face of a bell and spigot joint, and about 1 inch outwardly from the leak, as from the bell of a joint. In filling the form, it is advantageous to pour the sealing material from one side or end of the joint only; also, care should be taken in puddling the fluid cement composition in order to be sure that all air is removed, to thereby avoid air pockets, which would result in a leakage path after the concrete has cured and hardened. Following encapsulation around the leaking portion of the pipe, about five hours should be allowed before testing the joint for leakage. The joint should not be tested for leakage at pressures in excess of about 1.0 p.s.i.g. until the concrete has cured for about three days.

In selecting a surface active or wetting agent for utilization in the sealing composition, several factors are of particular importance. First, the wetting agent is to impart to the sealing composition the ability to penetrate and adhere to the interface between the cement and the surface of the pipe; in this regard, since the surface of the pipe may contain rust, scale, dirt, etc., it is important that the wetting agent also be compatible with such deposits, while, of couse, being compatible with the sealing composition itself. Also, the surface active agent is to provide a cured concrete which is substantially impermeable to gas. Furthermore, the resulting sealing composition should result in having an expansion of no greater than 0.1% by volume; if there is excessive expansion, the concrete pulls away from the surface of the pipe, while if there is excessive shrinkage, the concrete would crack. Although shrinkage is primarily controlled by other components in the composition, and their proportions, nevertheless the wetting agent must not adversely effect the desired shrinkage properties. It is of additional importance that the wetting agent does not unduly lengthen the cure time of the sealing composition, since otherwise there would be an excessive period during which the pipe line would be out of service, or on reduced service. Of course, the sealed joint is also to be of sufficient strength to withstand forces imparted, for example, by expansions and contractions of the pipe. Surface active agents that have been found useful in connection with my process include nonyl phenyl polyglycol ethers, containing about 4½–10½ mols of ethylene oxide, preferably about 9–10 mols of ethylene oxide, alkyl aryl sulfonates, and sodium alkyl aryl sulfonates. The ethoxylated nonyl phenol polyglycol ethers are nonionic and are commercially available under the Poly-Tergent trademark; Poly-Tergent B–300, containing 9–10 mols of ethylene oxide, has been found to be particularly satisfactory in my process. The alkyl aryl sulfonate surfactants are anionic and are available under the Ultrawets trademark; Ultrawet 60 L has been found to be particularly useful. The sodium alkyl aryl sulfonates are also anionic and are available under the Nacconol trademark; Nacconol Nr is particularly useful in the sealing composition. The alkyl aryl sulfonates above noted have alkyl groups of 8 to 15 carbon atoms on a benzene ring. Additionally the benzene ring may have attached thereto a triethylanolamine group, the total carbons in the molecule in such event being 20 to 27.

The process for preparing the sealing composition, useful in my method for sealing pressurized gas pipe, comprises the steps of mixing the components of the concrete-making, cement composition together in suitable proportions, and then about .0005–.05 part by weight of surface active agent per part of cement are folded into the mixture in order to avoid foaming, which would be likely to occur if the surfactants were added at an earlier stage in the preparation of the concrete composition. It is quite important that the mixing be gentle, that is, without agitation, in order to prevent the undesirable foaming. Foaming would result in a porous cement, which would be permeable to the passage of gas.

In order to control the shrinkage of the concrete sealing composition, following the curing and hardening thereof, the proportions of the components in the concrete are carefully controlled; also, the incorporation of about .02–.10 part by weight of iron powder per part of cement in the composition controls the shrinkage of the composition; it is preferred that about .025 part of iron powder be utilized in order to acquire the desired shrinkage of less than about 0.1%.

One method for preparing a sealing composition having all the desired properties, includes the steps of first mixing from about .8–1.2 parts by weight of Portland cement, type 1, preferably about 1.0 part, about 1.3–4.0 parts by weight of concrete sand, preferably about 2.6 parts, about 1.0–3.0 parts by weight of coarse aggregate, preferably about 2.0 parts, about .02–.10 part by weight of iron powder preferably about .025 part. Following the mixing of these dry ingredients, about .01–.03 part by weight of calcium chloride, preferably .02 per part, are added to about .5–.7 part by weight of water, preferably about 0.6 part, in order to shorten the cure time. The resulting solution is mixed with the dry ingredients. After the dry components and the calcium choloride solution are mixed together, about .0005–.05 part by weight of a surface active agent, Poly-Tergent B–300, preferably about 0.002 part, are gently folded into the cement formulation, without agitation. The mixture is then ready to be placed around the leaking portion of pipe in the manner previously described. In varying the proportions of the components in the sealing composition, it is of primary importance that the desired properties of the sealing composition, as previously set forth, be the result of the mixture.

It is therefore seen that I have provided a method for sealing substantially uncleaned gas pipe, which is both highly effective and inexpensive for sealing uncleaned, buried pipe, the sealing operation being accomplished with a minimum shutdown time. Also, I have provided a highly satisfactory method for producing a sealing composition which is useful in my sealing process.

While in the foregoing, particular details of the invention have been provided, it is to be understood that all equivalents obvious to those having skill in the art are to be included within the scope of the invention as claimed.

What I claim and desire to secure by Letters Patent is:

1. A process for sealing substantially uncleaned pipe comprising the step of excavating the space around a leaking portion of said pipe, placing a form around said leaking portion of pipe, and filling said form to cover said leaking portion with a concrete-making, Portland cement composition containing about .0005–.05 part by weight of a surface active agent per part of cement, said surface active agent being selected from the group consisting of nonyl phenol polyglycol ethers containing 4½–10½ mols of ethylene oxide, alkyl aryl sulfonates, and sodium alkyl aryl sulfonates the alkyl of said sulfonates having 8 to 15 carbons and the aryl being a benzene ring, said composition, when cured, being substantially impermeable to a gaseous medium, being capable of adhering to the substantially uncleaned surface of said pipe, and having a shrinkage of less than about 0.1% by volume.

2. The process of claim 1 wherein said concrete-making cement composition includes about .02–.10 part of iron powder to assist in controlling the shrinkage of said composition, and about .01–.03 part of calcium chloride for shortening the cure time of said composition.

3. The process of claim 1 wherein said surface active agent is nonyl phenol polyglycol ethers containing 9–10 mols of ethylene oxide.

4. The process of claim 3 wherein said concrete-making, cement composition includes about .8–1.2 parts by weight of Portland cement, about 1.3–4.0 parts by weight of concrete sand, about 1.0–3.0 parts by weight of coarse aggregate, about .02–.10 part by weight of iron powder, about .5–.7 part by weight of water, about .01–.03 part by weight of calcium chloride, and about .0005–.05 part by weight of said surface active agent.

5. The process of claim 3 wherein said concrete-making cement composition includes about 1.0 parts by weight of Portland cement, about 2.6 parts by weight of concrete sand, about 2.0 parts by weight of coarse aggregate, about 0.025 part by weight of iron powder, about 0.6 part by weight of water, about 0.02 part by weight of calcium chloride, and about 0.002 part by weight of said surface active agent.

6. A process for preparing a concrete-making, Portland cement composition useful in sealing leaking portions of substantially uncleaned pipe, said process comprising the steps of mixing the components of said composition together in suitable proportions, and then gently folding into said composition about .0005–.05 part by weight of a surface active agent per part of cement said surface active agent being selected from the group consisting of nonyl phenol polyglycol ethers containing 4½–10½ mols of ethylene oxide, alkyl aryl sulfonates, and sodium alkyl aryl sulfonates, the alkyl of said sulfonates having 8 to 15 carbons and the aryl being a benzene ring, said surface active agent being capable of wetting the interface between said concrete-making composition and the surface of said pipe, said composition, when cured, being substantially impermeable to a gaseous medium, being capable of adhering to the substantially uncleaned surface of said pipe, and has a shrinkage of less than about 0.1% per volume.

7. The process of claim 6 wherein said mixing step comprises mixing together about 0.8–1.2 parts by weight of said Portland cement, about 1.3–4.0 parts by weight of concrete sand, about 1.0–3.0 parts by weight of coarse aggregate, about .02–.10 per part by weight of iron powder, about 0.5–0.7 part by weight of water, and about .01–.03 per part by weight of calcium chloride.

8. The process of claim 6 wherein said surface active agent is nonyl phenol polyglycol ethers containing 9–10 mols of ethylene oxide.

9. A process for preparing a concrete-making cement composition useful for sealing leaking portions of substantially uncleaned pipe, said process comprising the steps of mixing together about 1.0 part by weight of Portland cement, about 2.6 parts by weight of concrete sand, about 2.0 parts by weight of coarse aggregate, about .025 part by weight of iron powder, adding a solution containing about .6 part by weight of water and about .02 part by weight of calcium chloride, and then gently folding into the mixture about .002 part by weight of a surface active agent of nonyl phenol polyglycol ethers containing 9–10 mols of ethylene oxide, said surface active agent being capable of wetting the interface between said concrete-making composition and the surface of said pipe, whereby, when cured, said composition is substantially impermeable to a gaseous medium, is capable of adhering to the substantially uncleaned surface of said pipe, and has a shrinkage of less than about 0.1% by volume.

References Cited by the Examiner

UNITED STATES PATENTS

| | | | |
|---|---|---|---|
| 1,719,210 | 7/1929 | Burn | 106—97 XR |
| 2,108,276 | 2/1938 | Wadsworth | 106—97 |
| 2,804,393 | 8/1957 | Veatch | 106—90 |
| 3,008,843 | 11/1961 | Jolly | 106—90 |
| 3,131,075 | 4/1964 | Brooks | 106—90 |

ALEXANDER H. BRODMERKEL, *Primary Examiner.*

L. HAYES, *Assistant Examiner.*